(12) United States Patent
Harley et al.

(10) Patent No.: US 6,323,978 B1
(45) Date of Patent: Nov. 27, 2001

(54) ROBUST VARIABLE-BIT-RATE OPTICAL CHANNEL OVERHEAD

(75) Inventors: James St. Leger Harley, Ottawa; Richard A. Habel; Avid Lemus, both of Nepean, all of (CA)

(73) Assignee: Nortel Networks Limited, St-Laurent (CA)

(*) Notice: Subject to any disclaimer, the term of this patent is extended or adjusted under 35 U.S.C. 154(b) by 0 days.

(21) Appl. No.: 09/055,360

(22) Filed: Apr. 6, 1998

(51) Int. Cl.[7] .................... H04B 10/02; H04B 10/04
(52) U.S. Cl. ................... 359/154; 359/177; 359/187
(58) Field of Search .................. 359/124, 187, 359/154, 177, 110, 181

(56) References Cited

U.S. PATENT DOCUMENTS

| | | | |
|---|---|---|---|
| 5,289,306 | * 2/1994 | Hirohashi et al. | 359/174 |
| 5,513,029 | * 4/1996 | Roberts | 359/177 |
| 5,515,438 | * 5/1996 | Bennett et al. | 380/21 |
| 5,548,433 | * 8/1996 | Smith | 359/158 |
| 5,745,274 | * 4/1998 | Fatehi et al. | 359/187 |
| 5,822,094 | * 10/1998 | O'Sullivan et al. | 359/110 |
| 5,859,716 | * 1/1999 | O'Sullivan et al. | 359/110 |
| 5,959,749 | * 9/1999 | Danagher et al. | 359/124 |

* cited by examiner

Primary Examiner—Leslie Pascal
Assistant Examiner—Dalzid Singh

(57) ABSTRACT

A method and apparatus for embedding control information in an optical signal transporting optical data, consisting of encoding the control information as a control signal having an amplitude proportional to a controllable modulation depth. The optical signal is then optically modulated in accordance with the amplitude of the control signal. The control signal is subsequently detected and the control information is decoded. A major feature of the invention lies in determining a level of similarity between the encoded and decoded control information and varying the modulation depth according to this level of similarity. Hence, the modulation depth yielding a given bit-error rate (BER) or signal-to-noise ration (SNR) can be minimized, in order to reduce the degradation of the optical channel data. The invention also provides a means for modulating the control information about a carrier frequency, and varying this carrier frequency if the SNR is below a certain tolerance value. This is useful in countering the periodic interference spectrum of framed data signals, which may be unknown or time-varying. Furthermore, the bit rate of the control signal can be adjusted to carry a required amount of information, so as to meet the system's evolving control requirements.

16 Claims, 5 Drawing Sheets

ROBUST VARIABLE-BIT-RATE OPTICAL CHANNEL OVERHEAD

FIELD OF THE INVENTION

The present invention relates to optical communications, and more particularly to a method and apparatus for controllably modulating an optical channel payload with an optical channel overhead.

BACKGROUND OF THE INVENTION

The optical channel (OCh) overhead is a communication channel optically "in band" with an associated OCh, which can be generated at the channel transmitter and read at any point in the optical network where the OCh is optically separated from other optical channels (at muxes, demuxes, optical network elements with tunable bandpass filters and optical channel receivers). The OCh overhead is required to be in band optically in order to be able to trace the OCh through wavelength selective devices. Depending on the network application, the OCh overhead can be used in channel identification for optical trace connectivity verification; it can also be employed as a communication channel for optical protection or for remote monitoring between transmitters and receivers. Moreover, the OCh overhead permits software downloads from optical channel transmitters to listening devices.

The optical channel overhead is typically a digital message signal $s(t)$ that is carrier modulated about a carrier one, yielding a carrier modulated OCh overhead message signal $q(t)$, and multiplied by a factor (known as the modulation depth, m), and which optically modulates the OCh payload in the optical channel. FIGS. 1A and 1B show how the oCh payload $p(t)$ and overhead $m \cdot q(t)$ (m multiplied by $q(t)$) make up an optically modulated signal $v(t)$, in the time and frequency domains, respectively. The OCh payload $p(t)$ is typically formed by a series of high-speed pulses of light of intensity Pav or 0 depending on the "non-return-to-zero" (NRZ) value (1 or −1 respectively) of the transmitted digital data $d(t)$. The digital data $d(t)$ generally has a bit rate that may exceed 10 gigabits per second (Gbps), and tlin OCh payload is typically formatted as an OC-192 signal.

An optical attenuator 302 will then modulate $p(t)$ with the OCh overhead $m \cdot q(t)$ so as to give an optically modulated signal $v(t)$ according to the following equation:

$$v(t)=[1+m \cdot q(t)]p(t)=Pav+[m \cdot q(t)+m \cdot q(t)d(t)+d(t)]Pav.$$

It can be shown that $v(t)$ ranges from 0 to $2 \cdot Pav \pm m|q(t)|Pav$, i.e., the average value of the peaks of $v(t)$ have an amplitude of $2 \cdot Pav$ and the peaks of $v(t)$ have an envelope of amplitude $m \cdot q(t)Pav$. The oCh overhead $m \cdot q(t)$ comprises a lower frequency analog (or digital) carrier modulated OCh overhead message signal $q(t)$ which is scaled by a modulation depth, or index, m. The signal $q(t)$ has a bandwidth (or bit rate) on the order of several dozen kHIz (or kbps), and is a carrier modulated version of a digital OCh overhead message signal $s(t)$, not shown in FIG. 1A. The value of m will determine the amplitude of the variation in the peaks of $v(t)$ relative to the average value of the peaks of $v(t)$. In prior art systems, the value of m is typically set to anywhere from 0.5% to 5%, and is fixed for a given fiber optic system.

In the frequency domain, the OCh payload $p(t)$ is seen as comprising a relatively flat data portion 101, and a periodic set of peaks 102, occurring at 8 kHz intervals. The peaks 102 are due to the 8 kHz periodic nature of data frames used in typical digital optical networks, such as SONET (synchronous optical network) and SDH (synchronous digital hierarchy). The OCh overhead $m \cdot q(t)$ is seen as a localized hump 103 centered about a carrier tone 106 at 202 kHz and rising above the flat portion 101 of the OCh payload data spectrum 101. the bit rate of the och overhead message signal prior to carrier modulation is represented by the width 104 of the hump 103. The modulation depth can also be viewed as the peak power of the carrier tone 106 relative to that of the repetitive peaks 102.

The main requirement of OCh overhead implementation is to support the aforementioned range of functions by providing an adequately high OCh overhead message signal bit rate, while keeping an acceptable bit-error rate (BER) of the OCh overhead message signal. In addition, one must attempt to limit the degradation incurred on the OCh payload by appropriately choosing the modulation depth.

Typically, peaks in the power spectral density of the Och payload (such as the peaks 102 seen in FIG. 1B) represent the dominant threat to maintaining a low BER of the OCh overhead message signal $s(t)$. The spectral peaks, which may vary from system to system (and in some cases may be unknown or slowly varying), interfere with the carrier tone 106 and message signal spectrum 103 of the OCh overhead and must be avoided. Prior art approaches fail to provide robust protection against periodic interference in the frequency domain. For example, the usage of spread spectrum techniques combined with subcarrier modulation attempts to exploit the capability of spread spectrum to mitigate the effects of interference. However, the presence of multiple harmonics from an interfering framed payload severely reduces this capability. Other prior art methods generally rely on a fixed frequency for the OCh overhead carrier tone 106, which leads to deleterious consequences when the OCh payload has an arbitrary frame rate.

Another factor that affects performance (BER) of the OCh overhead is the modulation depth. Since the BER of the OCh overhead message signal $s(t)$ decreases with an increase in the relative amount of optical. Power occupied by the OCh overhead, it is desirable to keep the modulation depth, M, large. On the other hand, too high a modulation depth causes degradation of the OCh payload. Clearly, there are conflicting requirements of keeping both the modulation depth and BER as low as possible. Quite often, the minimum modulation depth that can be achieved whilst keeping the BER to within a fixed upper bound depends on the distance between network elements or on properties of the network elements themselves and may even change as a function of time. Hence, it would be advantageous to use a variable modulation depth $m(t)$ for the OCh overhead message so that the BER of the OCh overhead message signal and degradation of the OCH payload are kept to a minimum.

An ability to vary the bit rate of the OCh overhead message signal would provide a great deal of flexibility for meeting evolving OCh overhead functional requirements, as well as increased overhead capacity for applications with no supervisory optical channel.

SUMMARY OF THE INVENTION

It is an object of the present invention to mitigate or obviate one or more disadvantages of the prior art.

Therefore, the invention may be summarized according to a first broad aspect as a method of embedding control information in an optical signal having an amplitude, comprising the steps of: encoding the control information as a control signal having an amplitude proportional to a controllable modulation depth; varying the amplitude of the optical signal in accordance with the amplitude of the control signal; detecting the control signal; decoding the control information; determining a level of similarity between the encoded and decoded control information; and varying the modulation depth according to the level of similarity between the encoded and decoded control information.

The invention may be summarized according to a second broad aspect as a method of embedding control information in an optical signal having an amplitude, comprising the steps of: encoding the control information as a control signal having an amplitude and having frequency content centered about a controllable carrier frequency; varying the amplitude of the optical signal in accordance with the amplitude of the control signal; determining an improved carrier frequency; and if the current carrier frequency is different from the improved carrier frequency, setting the carrier frequency equal to the improved carrier frequency.

According to a third broad aspect, the present invention provides a method of embedding control information in an optical signal having an amplitude, comprising the steps of: encoding the control information as a control signal having an amplitude and a controllable data rate; and varying the amplitude of the optical signal in accordance with the amplitude of the control signal; wherein the data rate of the control signal is dependent on the control information.

The invention may be summarized according to a fourth broad aspect as an apparatus comprising: an optoelectronic converter for detecting an optical signal having an embedded control signal and producing an electronic signal; a decoder/demodulator connected to the converter for demodulating the control signal by multiplying the electronic signal by a locally generated signal having a carrier frequency to produce a demodulated control signal, and for decoding the demodulated control signal to produce control information; and an adaptive receiver for identifying an alternate carrier frequency from the control information and for changing the frequency of the locally generated to the alternate carrier frequency upon failure of the carrier frequency.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 2:
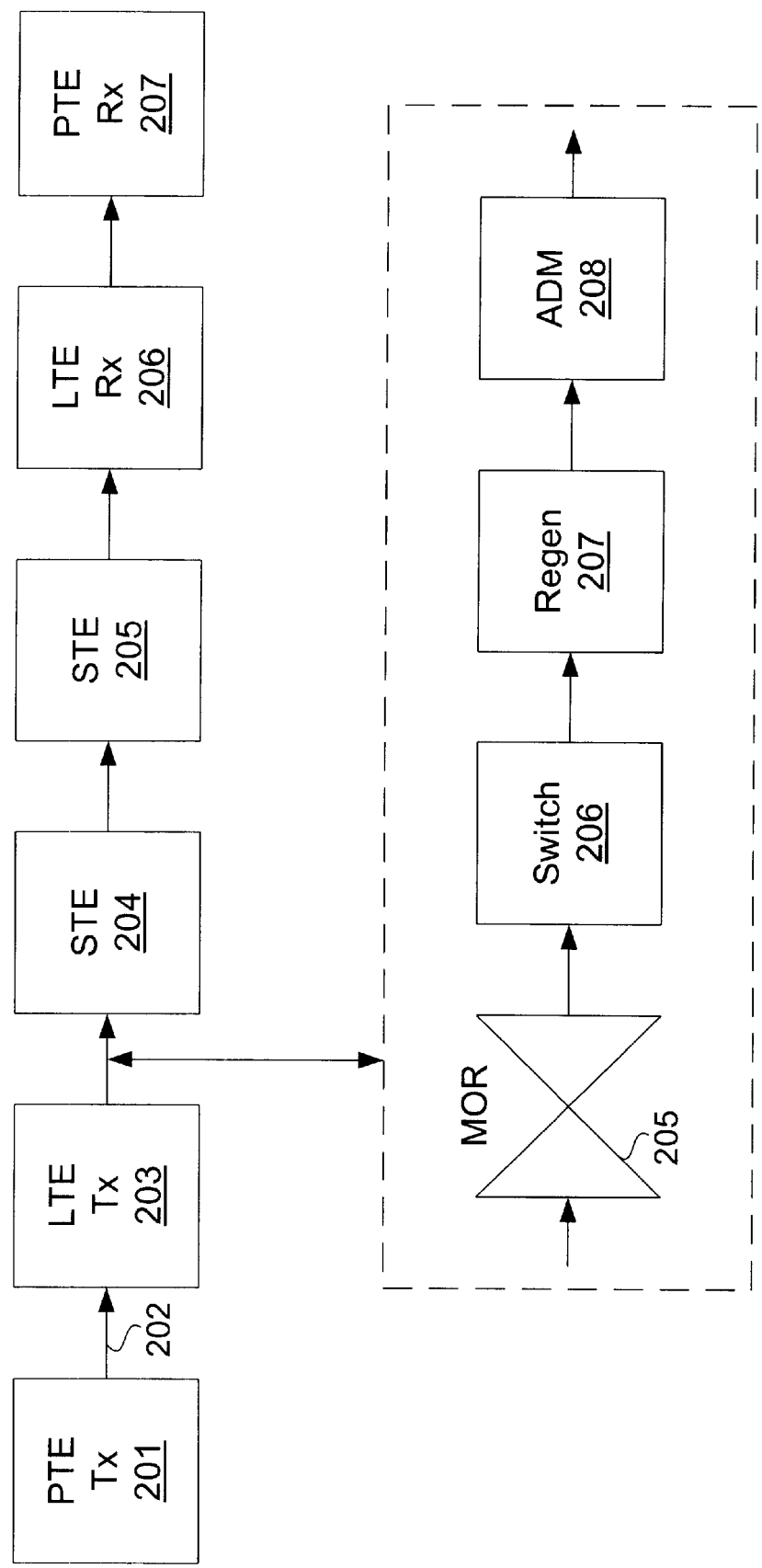
FIG. 2 is a block diagram of a typical portion of a prior art optical network.

Referring to FIG. 2, there is shown a typical path in a prior art optical communications network, comprising a path terminating equipment (PTE) transmitter 201 that assembles STS (synchronous transport signal) frames and multiplexes optical coherent channels onto an optical fiber 202 connected to a line terminating equipment (LTE) transmitter 203. The optical signal emitted by the PTE and arriving at the LTE is usually a wavelength-division multiplexed (WDM) optical signal, comprising up to 32 or 64 (or more) individual optical channels at distinct wavelengths.

The LTE transmitter is connected by optical fiber to a section terminating equipment (STE) 204 via a multi-wavelength optical repeater (MOR) 205, an optical switch 206, an optical regenerator 207 and an active add/drop multiplexer (ADM) 208. The STE 204 is similarly connected to another STE 205, which then leads to an LTE receiver 206 and a PTE receiver 207 that terminates the path by disassembling the STS frames and demultiplexing the WDM signal. It is to be understood that the optical fibers may carry bidirectional optical traffic, and that each component may be functional in both directions of traffic flow, as is often the case. Moreover, the way in which the various components are interconnected has been arbitrarily chosen, anid it is to be understood that the present invention applies to a network in which the network elements are arranged in other topologies.

The WDM optical signal may be available as a set of individual optical channels at various points along the path, namely at the regenerator 207, switch 206 or ADM 208. Also, the data is in demultiplexed form at the PTE transmitter 201. Prior to being transmitted (or retransmitted) by any or all of these components, the optical intensity of the OCh payload is optically modulated in accordance with the present invention, which is better described with reference to FIG. 3.

Inside a transmitting network element 300, the OCh payload p(t) (of an individual optical signal) passes through a controllable optical attenuator 302. It is assumed, without loss of generality, that the incoming OCh payload p(t) has not been previously tagged with an OCh overhead. The attenuator 302 creates an optically modulated signal v(t) by attenuating the OCh payload p(t) under control of an OCh overhead m(t)·q(t) received from a multiplier 327. Specifically, $$v(t)=[1+m(t)\cdot q(t)]p(t).$$

Figure 3:
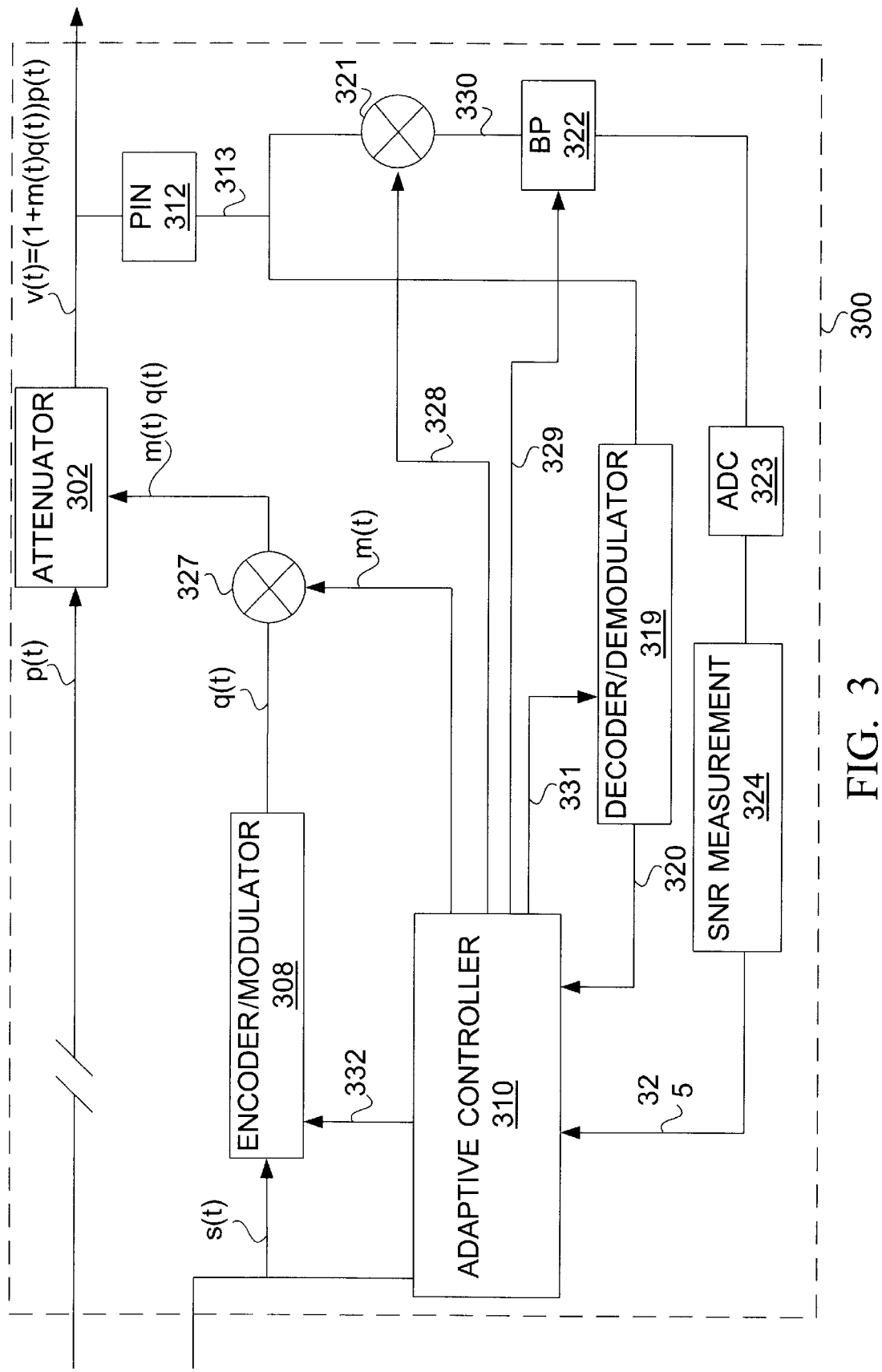
FIG. 3 is a block diagram of part of a transmitter in accordance with the present invention.

Multiplier 327 produces the OCh overhead m(t)·q(t) by multiplying a carrier modulated OCh overhead message signal q(t) by a time-varying modulation depth m(t). The signal q(t) is produced by an encoder/modulator 308 from a digital bit stream s(t), representing the OCh overhead message signal. The signal s(t), as well as the modulation depth mn(t), originate from an adaptive controller 310, which also controls the encoder/modulator 308 via a control line 332. The OCh overhead message signal is dependent on the functions to be executed in the desired application and optionally originates from outside the transmitting network element 300, as illustrated in FIG. 3.

As hinted to by its name, the encoder/modulator 308 encodes and modulates the OCh overhead message signal s(t), and is preferably a quadrature modulator (e.g., QAM, QPSK) that yields a narrowband signal centered about a carrier frequency, and may comprise an arrangement of multipliers, phase shifters, filters and digital-to-analog converters. The adaptive controller 310 is typically a digital signal processor (DSP) running a software algorithm.

The optically modulated signal v(t) (containing the OCh overhead) is partially diverted to a PIN diode 312, or other type of optoelectronic converter, prior to exiting the transmitting network element 300. The PIN diode 312 converts the optically modulated signal v(t) to an analog electronic signal 313, which is demodulated and decoded by a decoder/demodulator 319, The decoder/demodulator 319 is controlled by the adaptive controller via a control signal 331, and performs functions that are opposite to those of the encoder/modulator, generally requiring a similar arrangement of components. The decoder/demodulator 319 is also used in order to provide an assessment of the quality of the outgoing OCh overhead m(t)·q(t), and will require a signal processing component. The decoder/demodulator 319 provides a first feedback path 320 to the adaptive controller 310.

The analog electronic signal 313 also enters by a controllable multiplier 321 where it is multiplied by an oscillatory signal 328 from the adaptive controller 310, yielding a partially demodulated signal 330 that is fed to a programmable analog bandpass filter 322. ADC 323 converts the output of the filter 332 to digital format and feeds it to an SNR (signal-to-noise ratio) measurement block 324, which provides a second feedback path 325 to the adaptive controller 310. The adaptive controller 310 controls the parameters (center frequency, bandwidth coefficients, etc) of the filter 322 by a control signal 329.

It is to be understood that the encoder/modulator 308, decoder/demodulator 319 and SNR measurement block 324 may be separate electronic components or, alternatively, may be implemented as subroutines of a shared software algorithm. In fact, these components may well be implemented on the same DSP chip as the adaptive controller 310, in which case no mutual physical links are necessary.

Figure 4:
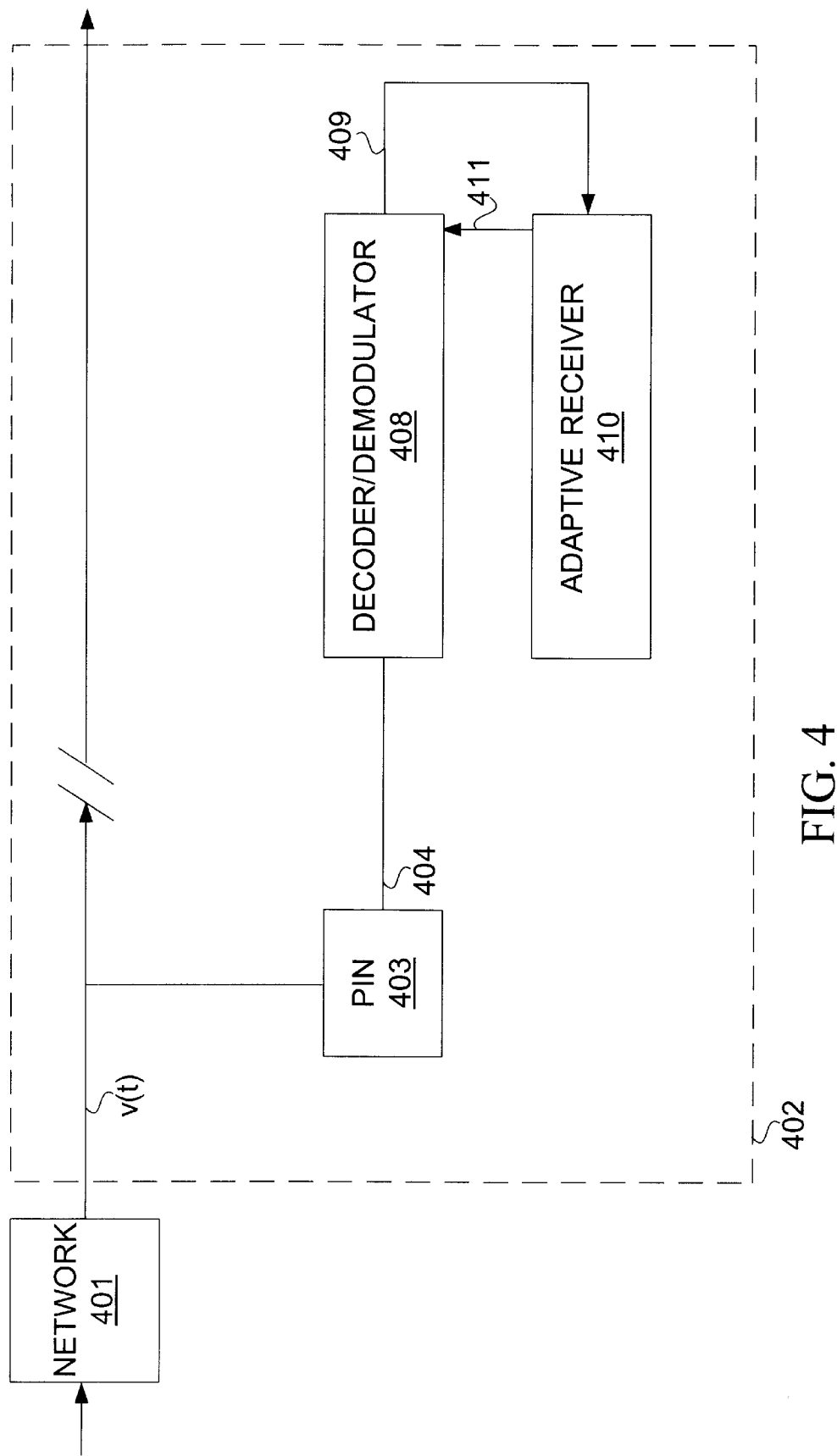
FIG. 4 is a block diagram of part of a receiver in accordance with the present invention.

As shown in FIG. 4, after passing through a network 401, consisting of network elements such as the MOR 205, switch 206, regenerator 207 or ADM 208 in FIG. 2, the optically modulated signal v(t) will be received by a receiving network element 402. A portion of the optical power will be tapped by a PIN diode 403, or other type of optoelectronic converter, and converted to an analog electronic signal 404. The optoelectronically converted signal 404 is passed to a decoder/demodulator 408 where it is demodulated to baseband and decoded to yield a received OCh overhead message signal 409. The internal structure of the decoder/demodulator 408 is an arrangement of multipliers, phase shifters, filters and analog-to-digital converters.

The received OCh overhead message signal 409 is fed to an adaptive receiver 410, which also controls the decoder/demodulator 408 via a control path 411. The adaptive receiver 410 may reside in the same DSP as the decoder/demodulator 408, and will usually be connected to other elements (not shown) of the receiving network element 402, thereby to control optical switches, attenuators or modulators.

Operation of the present invention is now described with reference to two modes of operation for the adaptive controller 310 and adaptive receiver 410, namely, "startup" and "ongoing". With reference to FIG. 3, the adaptive controller 310 provides the encoder/modulator 308 with an OCh overhead message signal s(t) at a pre-determined bit rate. This bit rate will depend on the tasks that are to be executed by the OCh overhead, i.e., on the messages to be transmitted to receiving network elements. In startup mode, therefore, the adaptive controller 310 begins by selecting an initial bit rate sufficient for execution of the application-dependent functions by the OCh overhead. The chosen bit rate preferably lies between 1 kbps and 128 kbps.

The adaptive controller 310 also chooses a modulation scheme to be used by the encoder/modulator 308. Examples of modulation schemes include trellis coded QAM, non-coded QPSK or BPSK and the v.34 modem standard. Still other schemes such as DSB-SC suppress the carrier frequency about which the OCh message signal is modulated. These techniques tend to reduce the bandwidth of the OCh overhead message signal by encoding multiple bits for each symbol, and distributing the modulated signal about a carrier frequency. The bit stream may also be encoded by the encoder/modulator 308 using a line code, such as 4B3T or 16B9Q, and further modulated about a carrier. The chosen modulation scheme will depend on the application, and as such, consideration of the particular technique is not crucial to understanding or implementing the present invention.

The adaptive controller 310 also selects the carrier frequency around which the carrier modulated OCh overhead message signal q(t) is to appear in the frequency spectrum. One method of determining an appropriate carrier in startup mode is for the adaptive controller 310 to generate sinusoids of various frequencies which are fed at selected times to the encoder/modulator 308 and to the decoder/demodulator 319. This will cyclically shift certain regions of the frequency spectrum into the frequency range passed by a filter in the decoder/demodulator 319, at which point the noise level in each region can be measured using known techniques by the decoder/demodulator 319.

Figure 1A:
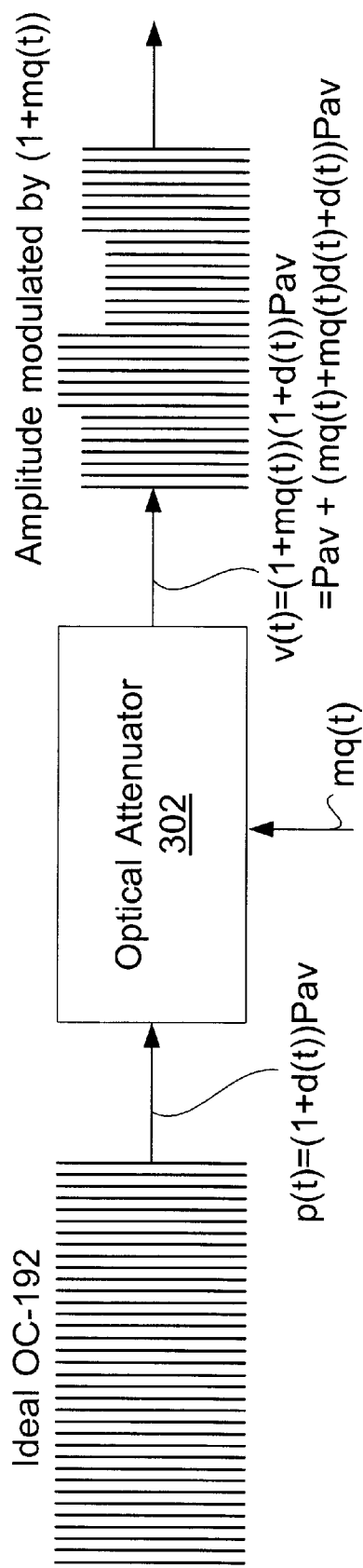
FIGS. 1A and 1B are respectively time and frequency domain representation of an OCh payload and overhead as taught by the prior art.
Figure 1B:
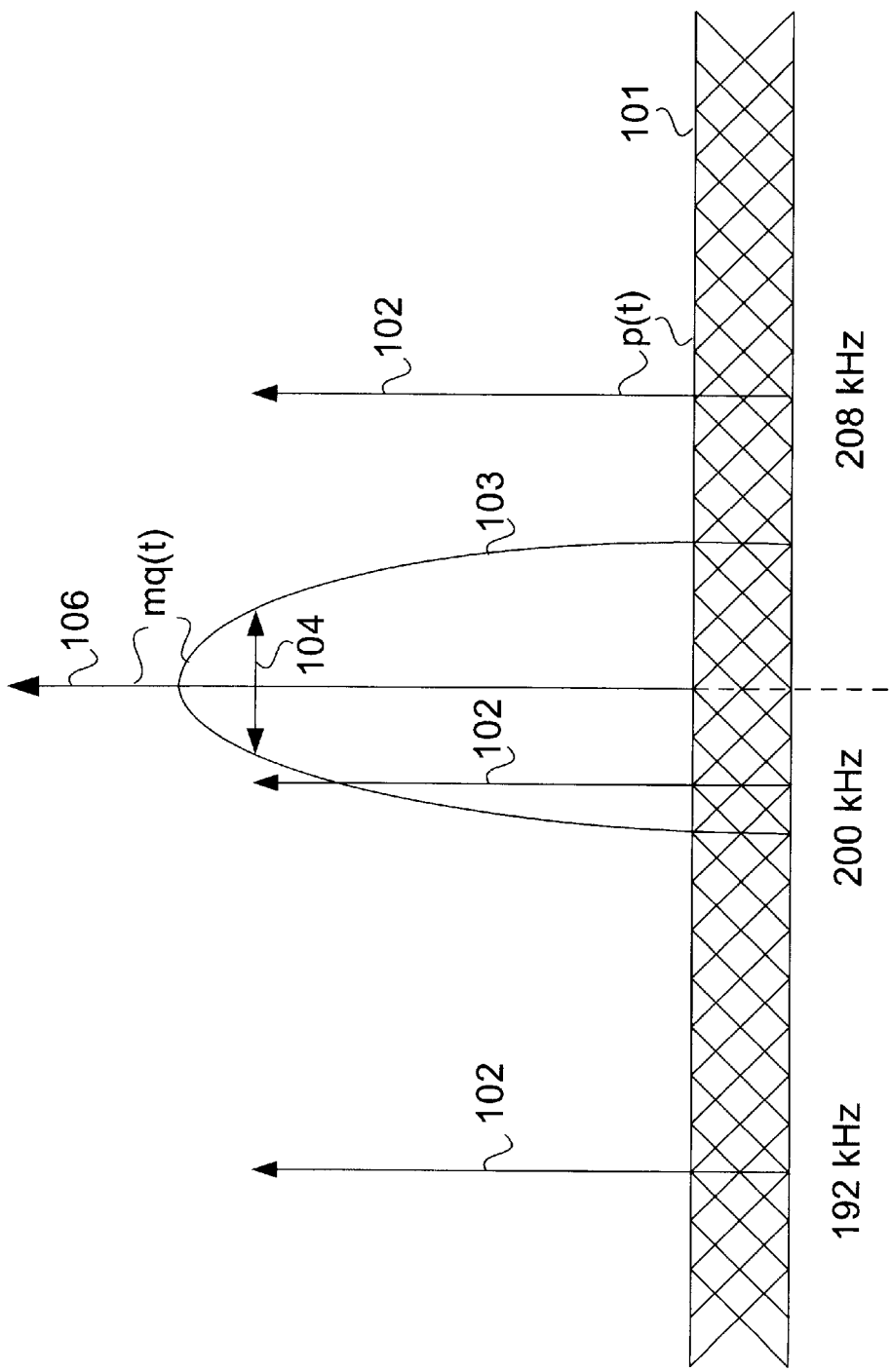

The adaptive controller 310 can thus monitor the noise content of each spectral region and make a decision as to the best possible location for a carrier signal. The carrier frequency is preferably selected in the range from 100 to 500 kHz and in an exemplary network employing SONET or SDH, the carrier may be positioned midway between two peaks separated by 8 kHz in the frequency domain, e.g., at 204 KHz in FIG. 1B.

The OCh overhead message signal s(t) at the minimum bit rate is thus carrier modulated using the selected modulation scheme and the adaptive controller 310 subsequently enters ongoing mode. The carrier modulated OCh overhead message signal q(t) is fed to the multiplier 327, where it is multiplied by the modulation depth m(t), initially set to a value that is known to yield a satisfactory BER (typically 0.5% to 5% relative to the amplitude of the OCh payload).

During ongoing mode, the objectives are: (A) to minimize the modulation depth while maintaining adequately low BER; and (B) to scan for the best alternative carrier frequency in case of failure of the current carrier frequency. The first objective is attained by the adaptive controller 310 providing the currently used carrier frequency to the decoder/demodulator 319, which attempts to demodulate and decode the OCh overhead message signal s(t). The bit-error rate (BER) can then be measured by the decoder/demodulator 319 using correlative techniques and if a maximum BER threshold is not exceeded, then the adaptive controller 310 will be told to reduce the modulation depth m(t) fed to the multiplier 327 in increments of preferably 1% to 10% of the original value for the modulation depth.

The decoder/demodulator 319 can also measure the modulation depth that has been applied, by envelope detection of the analog electronic signal 313. As before, the adaptive controller 310 selects a new value for the modulation depth; however, this new value can be adjusted in order to compensate for a difference between the applied and measured modulation depths. Another option includes the decoder/demodulator 319 measuring the SNR in the currently used spectral range, based on the amplitude of the carrier frequency, and comparing the result to a predetermined tolerance limit. It is also possible to relegate some measurement and comparison functions to the adaptive controller 310, simply providing it with a digital representation of the demodulated and/or decoded OCh message signal. In all cases, a feedback process is established and continues until a minimum modulation depth is reached, which gives a tolerable BER or SNR. This minimum may occur at a modulation index of anywhere from 0.5% to 5%.

The second objective can be met in many ways. Preferably, the adaptive controller 310 cyclically provides the multiplier 321 with a number of different sinusoids that will cause heterodyning of corresponding spectral bands down to baseband (or any other convenient frequency). The filter 322 passes only the frequencies in each band so that the SNR measurement block 324 may determine, using known techniques, not only the SNR of the spectral region surrounding the currently used carrier frequency, but also that of regions surrounding other carrier frequencies that could be used in case of failure of the current one.

The SNR measurements are reported via signal 325 to the adaptive controller 310, which makes the decision as to the alternate carrier frequency and can insert data about this alternate frequency into the OCh overhead message itself, thereby to inform the downstream receiving network elements of the alternate reference if a change of carrier frequency were to occur. If the currently used carrier frequency does fail (by yielding an SNR that is degraded by a predetermined threshold), then a switch to the alternate carrier is initiated by the adaptive controller 310. If the alternate carrier also fails, then the adaptive controller 310 re-enters startup mode and searches for the best carrier frequency, in the manner described previously.

There are cases in which the bit rate of the OCh message overhead signal s(t) must undergo a change, e.g., when the functions to be executed by the OCh overhead are updated. The present invention is flexible in that the value of the new bit rate, and indeed any other changes in the manner in which the OCh message signal is to bg interpreted, can be encoded in the OCh message signal and switched to after a predetermined hold-off time. (The carrier frequency and/or modulation scheme can also be reselected, which is essentially equivalent to returning to startup mode.)

With reference to FIG. 4, at the receiving network element 402, the adaptive receiver 410 also has startup and ongoing modes of operation. In startup mode, the first step is to locate the carrier frequency about which the OCh overhead is positioned. In order to achieve this, the decoder/demodulator 408 is preferably instructed by the adaptive controller to cyclically heterodyne different portions of the opectrumn of the analog electronic signal 404 (comprising both OCh payload and OCh overhead). After conversion to digital format by an ADC inside the decoder/demodulator 408, the signal-to-noise ratio in the different spectral regions is measured by the adaptive receiver 410 and the carrier frequency of the OCh overhead embedded within v(t) can thus be isolated. The adaptive receiver 410 can identify the modulation type by acquiring several samples of the OCh overhead down-converted to baseband or any other convenient frequency. Alternatively, the decoder/demodulator 408 may perform the SNR measurements, leaving any control functions to the adaptive receiver 410.

In ongoing mode, after determining the carrier frequency and modulation type, the adaptive receiver 410 will instruct the decoder/demodulator 408 to demodulate and decode the incoming OCh overhead in order to extract the OCh overhead message signal s(t). The adaptive receiver 410 then reacts to the messages and makes decisions which will depend on the application and on the interpreted messages, and which may range from switching the optical channel, attenuating it or further optically modulating the OCh payload. The adaptive receiver 410 will also decipher and store the value of the alternative carrier frequency that is to be used in case the current carrier is lost. Naturally, if the alternative carrier is not functional either, then the carrier recovery process is shunted to startup mode. If the decoded message is one indicating that the message format itself is about to change, then the adaptive receiver 410 will assume this new format after a predetermined hold-off time, which may even be specified as part of the decoded OCh overhead message.

In summary, the inventive method of implementing OCh overhead supports different OCh overhead functions while adaptively minimizing the modulation depth. The OCh overhead message signal is flexible in bit rate to support time varying or future OCh functions. The adaptive positioning of a carrier frequency make this scheme robust to any toned interference from any frame structure or repetitive data structure.

While the preferred embodiment of the present invention has been described and illustrated, it will be apparent to one skilled in the art that numerous modifications and variations are possible. For example, when selecting an alternate carrier frequency, it is possible to bypass the steps involving the measurement of SNP, and the transmission of an alternate carrier as an additional message embedded in the OCh overhead. Instead, it may be desirable to automatically hop through a predetermined set of frequencies (e.g., stored in a table) at predetermined time intervals. The same table would be known at the receiver, thereby simplifying the carrier frequency change procedure. Optionally, no alternate carrier need be used, and the adaptive controller 310 and adaptive receiver 410 can be programmed to enter startup mode whenever the carrier tone is lost.

It is also to be understood that analog-to-digital conversion performed by ADCs at the transmitting network element 300 may be executed immediately following optoelectronic conversion by the PIN diode 312, with all subsequent operations being performed in the digital domain. Similarly, the carrier modulated OCh overhead message signal q(t) can undergo multiplication by the modulation depth prior to digital-to-analog conversion. In view of these and many other possible implementations, the scope of the invention is only to be limited by the claims appended hereto.

We claim:

1. A method of embedding control information in an optical signal having an amplitude, comprising the steps of:

encoding the control information as a control signal having an amplitude proportional to a controllable modulation depth;

varying the amplitude of the optical signal in accordance with the amplitude of the control signal;

detecting the control signal;

decoding the control information;

determining a level of similarity between the encoded and decoded control information; and varying the modulation depth according to the level of similarity between the encoded and decoded control information.

2. A method according to claim 1, wherein the control signal is a modulated signal having frequency content centered about a controllable carrier frequency, the method further comprising the steps of:

determining an improved carrier frequency; and if the carrier frequency is different from the improved carrier frequency, setting the carrier frequency equal to the improved carrier frequency.

3. A method according to claim 2, wherein the control signal is a quadrature modulated signal.

4. A method according to claim 1, wherein the control signal has a controllable data rate that is dependent on the control information.

5. A method according to claim 2, wherein the control signal has a controllable data rate that is dependent on the control information.

6. A method of embedding control information in an optical signal having an amplitude, comprising the steps of:

encoding the control information as a control signal having an amplitude and having frequency content centered about a controllable carrier frequency;

varying the amplitude of the optical signal in accordance with the amplitude of the control signal;

determining an improved carrier frequency; and if the current carrier frequency is different from the improved carrier frequency, setting tho carrier frequency equal to the improved carrier frequency.

7. A method according to claim 6, wherein the control signal has a controllable data rate that is dependent on the control information.

8. A method according to claim 6, further comprising the steps of:

determining an alternate carrier frequency different from the current carrier frequency;

encoding the alternate carrier frequency in the control signal;

if the improved carrier frequency is equal to the alternate carrier frequency, setting the carrier frequency equal to the alternate carrier frequency after a predetermined time interval.

9. In a network element for use in an optical communications network, a method of extracting control information encoded in a control signal, the control signal being embedded in an optical signal and having frequency content centered about a carrier frequency, the control information comprising an alternate carrier frequency, the optical signal having an envelope, the envelope having an amplitude proportional to a modulation depth, comprising:

detecting the optical signal;

demodulating the control signal by multiplication with a locally generated signal at the carrier frequency;

decoding the control information;

determining the alternate carrier frequency;

changing the frequency of the locally generated signal from the carrier frequency to the alternate carrier frequency upon failure of the carrier frequency.

10. An apparatus for embedding control information in an optical input signal having an amplitude, comprising:

an encoder/modulator for encoding and modulating the control information and for producing a modulated control signal having frequency content centered about a carrier frequency;

a multiplier connected to the encoder/modulator for multiplying the modulated control signal by a controllable modulation depth and for producing an overhead signal having an amplitude;

a controllable optical attenuator for varying the amplitude of the optical input signal in accordance with the amplitude of the overhead signal and for producing an optically modulated output signal;

an optoelectronic converter connected to the optically modulated output signal, for converting said optically modulated output signal to an electronic signal;

a decoder/demodulator connected to the converter, for detecting a modulated control signal embedded in the electronic signal and demodulating and decoding the detected modulated control signal and for producing decoded control information; and an adaptive controller connected to the encoder/modulator, the multiplier and the decoder/demodulator, for determining a level of similarity between the encoded and decoded control information, and for varying the modulation depth until a predetermined level of similarity between the encoded and decoded control information is reached.

11. An apparatus according to claim 10, wherein the adaptive controller supplies the carrier frequency to the encoder/modulator, the apparatus further comprising:

measurement means for continuously measuring signal-to-noise ratio in a plurality of spectral bands respectively surrounding a plurality of predetermined candidate carrier frequencies;

wherein the adaptive controller compares the signal-to-noise ratio in each band and selects the candidate carrier frequency having a corresponding band with the highest signal-to-noise ratio, thereby to select an improved carrier frequency; and wherein the adaptive controller sends the improved carrier frequency to the encoder/modulator.

12. An apparatus according to claim 10, wherein the control information is a digital information signal generated by the adaptive controller and having a bit rate, wherein the bit rate is a function of time.

13. An apparatus according to claim 10, wherein the adaptive controller is a digital signal processor running a software algorithm.

14. An apparatus according to claim 10, wherein the encoder/modulator is a digital signal processor running a software algorithm.

15. An apparatus according to claim 10, wherein the decoder/demodulator is a digital signal processor running a software algorithm.

16. An apparatus comprising:

an optoelectronic converter for detecting an optical signal having an embedded control signal and producing an electronic signal;

a decoder/demodulator connected to the converter for demodulating the control signal by multiplying the electronic signal by a locally generated signal having an original carrier frequency to produce a demodulated control signal, and for decoding the demodulated control signal to produce control information; and an adaptive receiver for identifying an alternate carrier frequency from the control information and for changing the frequency of the locally generated signal to the alternate carrier frequency upon failure of the original carrier frequency.

* * * * *